(12) United States Patent
Wettlaufer, Jr.

(10) Patent No.: US 7,798,508 B2
(45) Date of Patent: Sep. 21, 2010

(54) ACTIVE STABILIZER BAR SYSTEM FOR A VEHICLE CHASSIS

(75) Inventor: Edward Frederick Wettlaufer, Jr., St. Clair Shores, MI (US)

(73) Assignee: Altair Engineering, Inc., Troy, MI (US)

( * ) Notice: Subject to any disclaimer, the term of this patent is extended or adjusted under 35 U.S.C. 154(b) by 89 days.

(21) Appl. No.: 12/266,964

(22) Filed: Nov. 7, 2008

(65) Prior Publication Data

US 2009/0174226 A1 Jul. 9, 2009

Related U.S. Application Data

(60) Provisional application No. 61/019,048, filed on Jan. 4, 2008.

(51) Int. Cl.
*B60G 3/02* (2006.01)
(52) U.S. Cl. ............... 280/124.152; 280/5.511; 280/124.1; 280/124.149; 280/5.506
(58) Field of Classification Search ............ 280/5.511, 280/124.1, 124.106, 124.149, 124.152, 5.506; 296/35.2, 1.04
See application file for complete search history.

(56) References Cited

U.S. PATENT DOCUMENTS

| | | | |
|---|---|---|---|
| 3,448,994 A | 6/1969 | King et al. | |
| 4,084,838 A | 4/1978 | von der Bruck et al. | |
| 4,648,620 A | 3/1987 | Nuss | |
| 4,796,911 A | 1/1989 | Kuroki et al. | |
| 4,962,943 A | 10/1990 | Lin | |
| 5,217,245 A | 6/1993 | Guy | |
| 5,251,926 A | 10/1993 | Aulerich et al. | |
| 5,417,407 A | 5/1995 | Gordon | |
| 5,573,265 A | 11/1996 | Pradel et al. | |
| 5,601,165 A | 2/1997 | Oppitz et al. | |
| 5,749,596 A | 5/1998 | Jensen et al. | |
| 5,826,687 A | 10/1998 | Bungeler et al. | |
| 5,882,017 A | 3/1999 | Carleer | |
| 6,022,030 A | 2/2000 | Fehring | |
| 6,149,166 A | 11/2000 | Struss et al. | |
| 6,190,260 B1 | 2/2001 | Flores et al. | |
| 6,318,737 B1 | 11/2001 | Marechal et al. | |
| 6,428,019 B1 | 8/2002 | Kincad et al. | |
| 6,520,510 B1 | 2/2003 | Germain et al. | |
| 6,554,305 B2 | 4/2003 | Fulks | |
| 2006/0290079 A1 | 12/2006 | Smay | |

FOREIGN PATENT DOCUMENTS

| | | |
|---|---|---|
| GB | 2212770 A | 8/1989 |
| GB | 2220625 A | 1/1990 |
| JP | 2000-313218 | 11/2000 |
| JP | 2001-315518 | 11/2001 |

OTHER PUBLICATIONS

International Search Report dated Jun. 23, 2009.

*Primary Examiner*—Lori L Lyjak
(74) *Attorney, Agent, or Firm*—Young Basile

(57) ABSTRACT

An active stabilizer bar system includes an impeller slidably encased in a housing which separates the housing into a sealed first cavity and a second cavity. On forced application of fluid through at least one of the ports, the impeller is axially moved along the housing which rotates at least one rotor with respect to the housing to vary the forces applied by the stabilizer bar on the vehicle suspension.

19 Claims, 4 Drawing Sheets

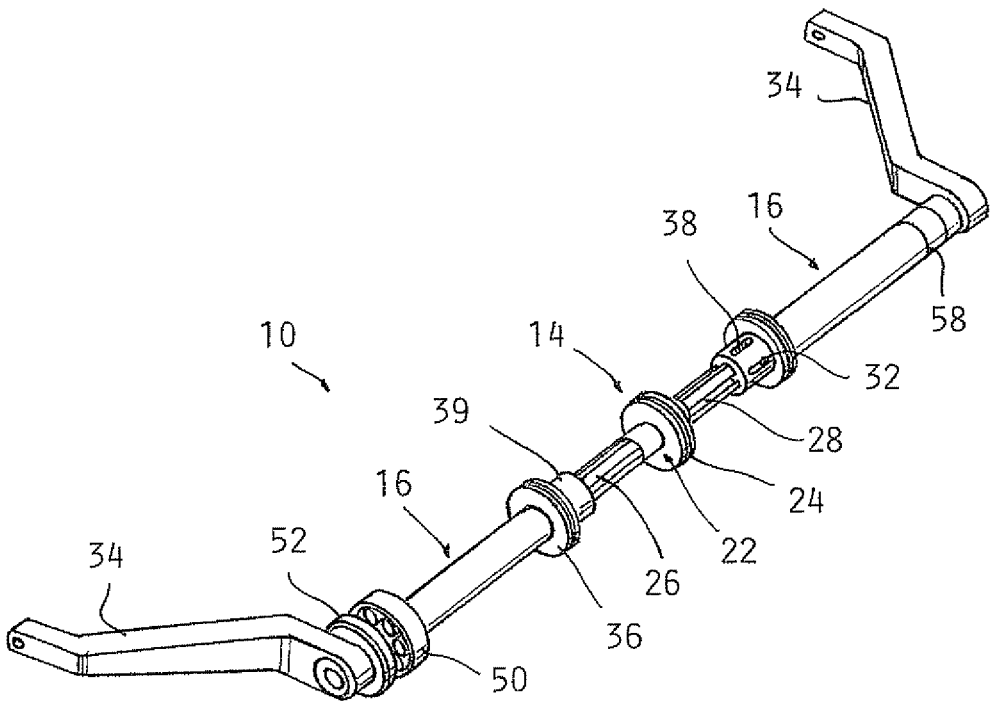
FIG. 4
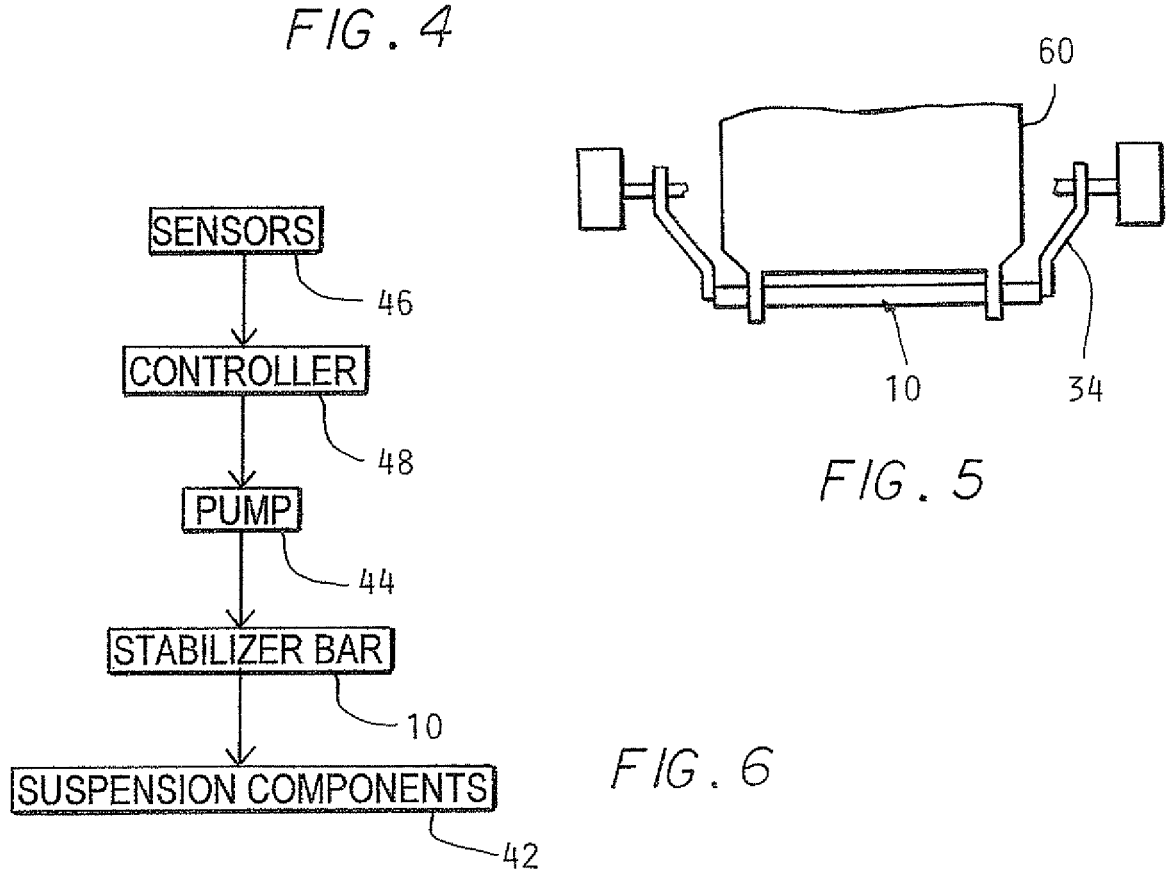
FIG. 5
FIG. 6

ACTIVE STABILIZER BAR SYSTEM FOR A VEHICLE CHASSIS

CROSS-REFERENCE TO RELATED APPLICATIONS

This application claims the benefit of provisional patent application No. 61/019,048 for a Multiple Component Stabilizer Bar For A Vehicle Chassis, filed on Jan. 4, 2008, the entire contents of which are incorporated herein by reference.

FIELD OF THE INVENTION

The present invention relates to a multiple component stabilizer bar system for a vehicle chassis that actively controls vehicle roll, weight transfer and handling.

BACKGROUND

Vehicles have a tendency to roll (rotate about the longitudinal axis) when turning, especially when traveling at a high velocity. Stabilizer bars have been introduced to reduce the amount of roll a vehicle experiences while turning. Early stabilizer bars were simply metal rods fixed to the structure of the vehicle and connected to suspension components of the vehicle. During vehicle roll, the wheels are not equidistant from the body. Early stabilizer bars resisted body roll about the roll axis through a moment or couple generated by the difference in wheel travel left to right. The magnitude of the couple is a function of the size of the bar and the difference in wheel travel.

SUMMARY

The present invention teaches an active stabilizer bar system for a vehicle. In one example, a housing having fluid ports encloses an impeller and two rotors, one on each side of the impeller. The impeller can be slidable in the housing and is rotatably coupled to each of the rotors. The rotors are adapted for connection to stabilizer bar arms. In one example, fluid is pumped into one of the fluid ports in response to a state of the vehicle, such as the lateral acceleration, roll angle, steering wheel angle, velocity, or yaw of the vehicle, thereby creating a pressure difference across the impeller that forces the impeller to slide axially in the housing. As the impeller slides, the couplings between the impeller and the rotors cause the rotors to rotate in opposite directions.

In an alternate example, only one rotor is used with the impeller allowing the connected stabilizer bar arm to rotate relative to the housing which is fixed to the other stabilizer bar arm.

The rotors or rotor and housing thus selectively apply force to suspension components, resulting in enhanced or selectively altered vehicle stability. The present system allows coupling or decoupling between laterally positioned wheels in both roll and/or ride motion up to the travel limits of the vehicle suspension. When the vehicle is adequately stable, the impeller is relatively freely rotatable in the housing so as not to interfere with the normal operation of the suspension. Thus, the active stabilizer bar system can selectively apply an adjustable magnitude of force to enhance the stability of the vehicle when desired or when necessary.

BRIEF DESCRIPTION OF THE DRAWINGS

The description herein makes reference to the accompanying drawings wherein like reference numerals refer to like parts throughout the several views, and wherein:

FIG. 4 is an isometric view of the active vehicle stabilizer bar shown in FIG. 1 without the housing;

FIG. 5 is a schematic top view of the active vehicle stabilizer bar attached to suspension components of a vehicle;

FIG. 6 is a flowchart showing an example of the operation of the active vehicle stabilizer bar system.

DETAILED DESCRIPTION

Prior conventional rod stabilizer bars provide roll-countering force to opposite sides of the suspension system of a vehicle whenever the wheels exhibit differential distance from the vehicle body, which is hereinafter referred to as the wheels being out of phase. Thus, the response of a conventional stabilizer bar is only a function of the stiffness of the bar, related components such as bushings and the phase of the wheels, resulting in sub-optimal vehicle stability and minimal counter-active control. For example, if a driver makes a relatively sharp turn given the speed of his or her vehicle, such as an evasive maneuver to avoid an accident on a highway, the response of the conventional stabilizer bar will lag behind the inertial reactions of the vehicle. The response lag may cause the bar to overshoot the desired amount of force to be applied and often increases the time required for the vehicle to return to a stable state. If the vehicle is subject to a side-wind, the conventional stabilizer bar provides a force to counter the body roll caused by the wind that lags behind the effect of the wind of the vehicle. Further, the driver must steer the vehicle to counteract the stabilizer bar force. Similarly, if just one wheel hits a bump, the conventional stabilizer bar reacts to the wheels being out of phase as a result of the bump and provides a stabilizing force even though the vehicle is not experiencing lateral acceleration. To counteract the stabilizer bar force, the driver must steer the vehicle to keep it moving in a straight line. If the vehicle understeers a turn due to a low friction driving surface, the conventional stabilizer bar is of no benefit because the vehicle is not undergoing body roll. The present embodiments represent improvements over the problems associated with conventional rod stabilizer bars.

Figure 1:
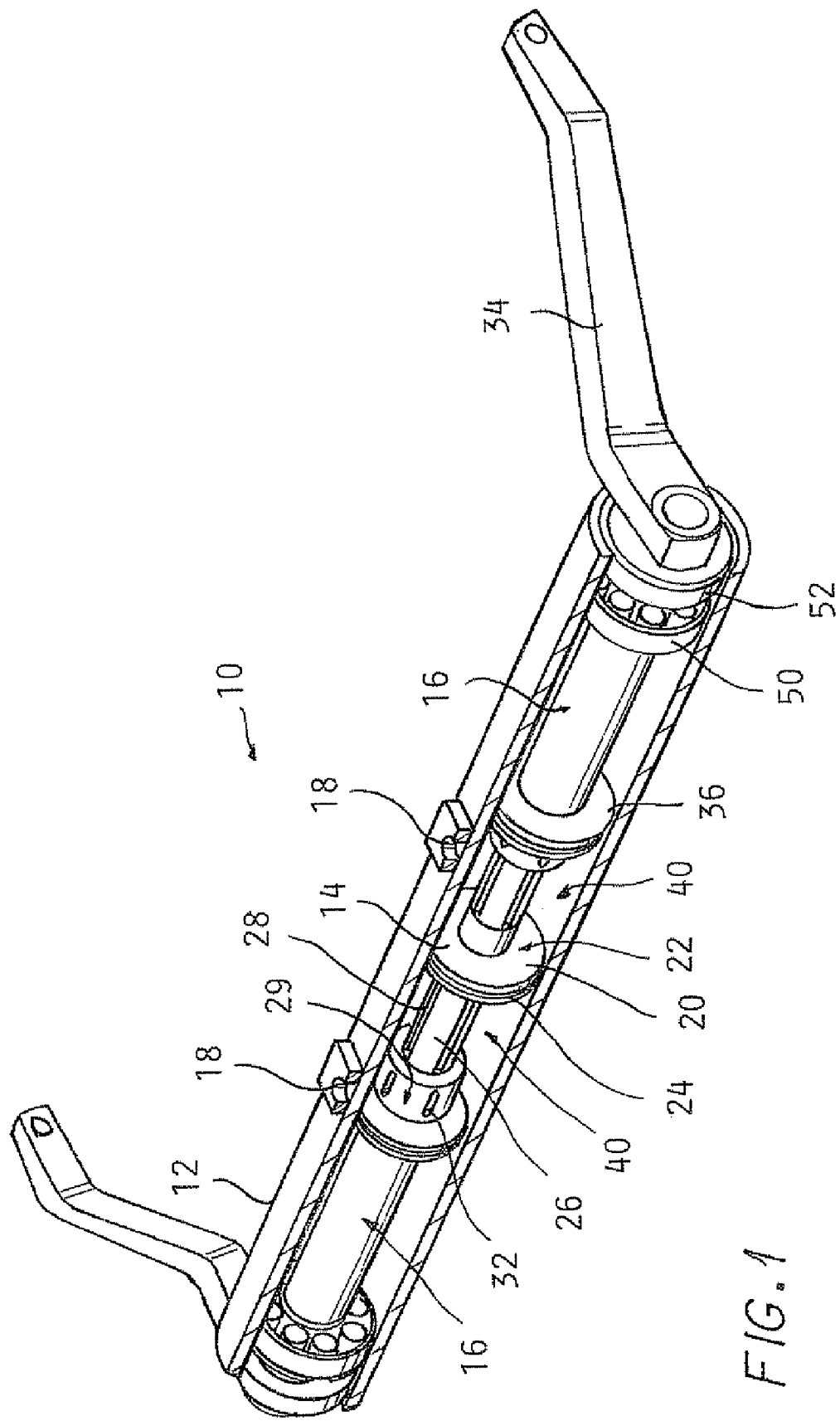
FIG. 1 is an isometric view of an example of the adjustable vehicle stabilizer bar system with a cutaway to show its internal components.
Figure 7:
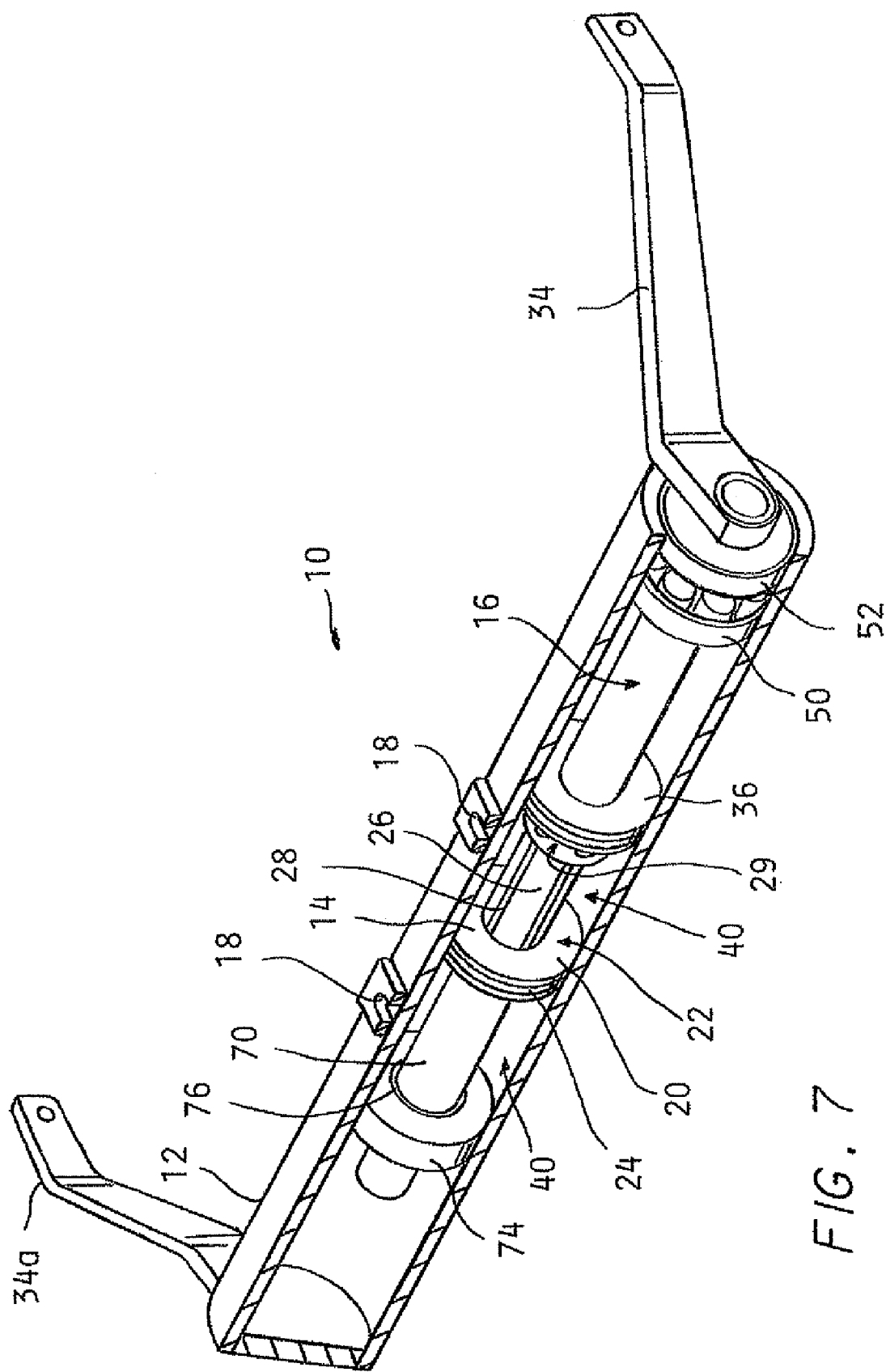
FIG. 7 is a partially cut-away isometric view of an alternate example of the stabilizer bar system shown in FIG. 1.

One embodiment of a multiple component stabilizer bar system for a vehicle chassis is disclosed herein with reference to the FIGS. 1-6. An alternate example is illustrated in FIG. 7. As illustrated in FIG. 1, an embodiment of components for the active vehicle stabilizer bar system 10 includes a housing 12 enclosing an impeller 14 and two rotors 16. In a preferred example, the housing 12 is tubular with a circular cross-section. The housing 12 includes two fluid ports 18, one on each side of the impeller 14. The ends of the housing 12 include openings. The interior diameter of the housing 12 can include a step (not shown) which decreases the diameter of the housing 12 a short axial distance from each end of the housing 12 to provide a physical seat for an outer bearing 50. The housing 12 is preferably constructed from cast aluminum, while the impeller 14 and rotors 16 are constructed from steel. Alternatively, the components could be constructed from other metals (e.g., the housing 12 can be steel or titanium, and the impeller 14 and rotors 16 can be aluminum or titanium), composites (e.g., carbon fiber), plastic, or other materials recognized as suitable to one of skill in the art having knowledge of this application.

Figure 2:
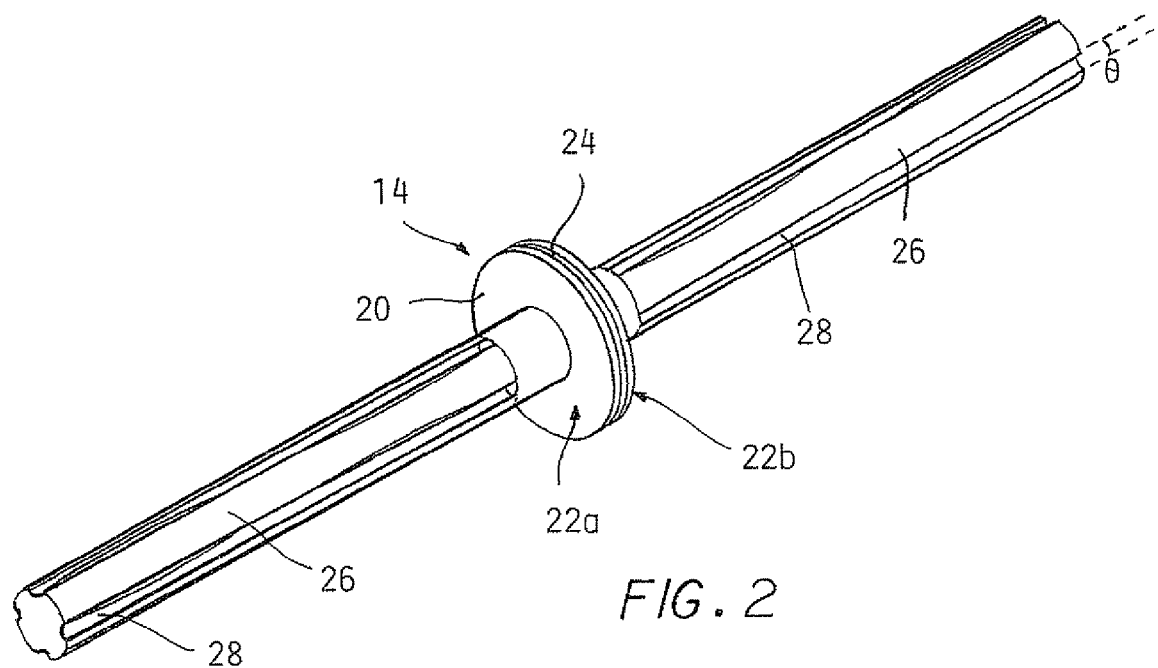
FIG. 2 is an isometric view of the impeller shown in FIG. 1.

An example of the impeller 14 is shown in isolation in FIG. 2. The impeller 14 includes a piston 20 having two faces 22a, 22b. The piston 20 has an outer circumference slightly smaller than the inner diameter of the housing 12. A seal 24 circumscribes the outer circumference of piston 20 in order to create a seal across the piston 20. The seal 24 can include a low-friction material, such as Teflon, to reduce the force required to axially move the impeller 14 relative to the housing 12. Two shafts 26 extend axially in opposite directions, one from each face 22a, 22b of the piston 20. Each shaft 26 includes at least one helical groove 28. The helical grooves 28 on the two shafts 26 spiral in opposite directions. If multiple grooves 28 are placed on a single shaft 26, the grooves 28 can be equally spaced about the circumference of the shaft 26. The angle θ of the grooves 28 relative to the axial direction of the shafts 26 can be small, for example up to about fifteen degrees. As illustrated, the angle θ is seven to eight degrees. If the angle θ is too large, too large of a force may be required to move the impeller 14 laterally; if the angle θ is too small, the impeller 14 has to travel a greater distance to output the same force, which can require too large of a housing 12. The angle θ can be based on the amount of force required to affect vehicle handling. For example, a large SUV may require an angle θ of approximately eight degrees, while a nimble sports car may require an angle θ of only approximately four degrees. The availability of space for the housing 12 can also be a factor in determining the optimal angle θ. Angles θ above 15 and below 4 degrees may be used to suit the particular application or desired performance.

Figure 3:
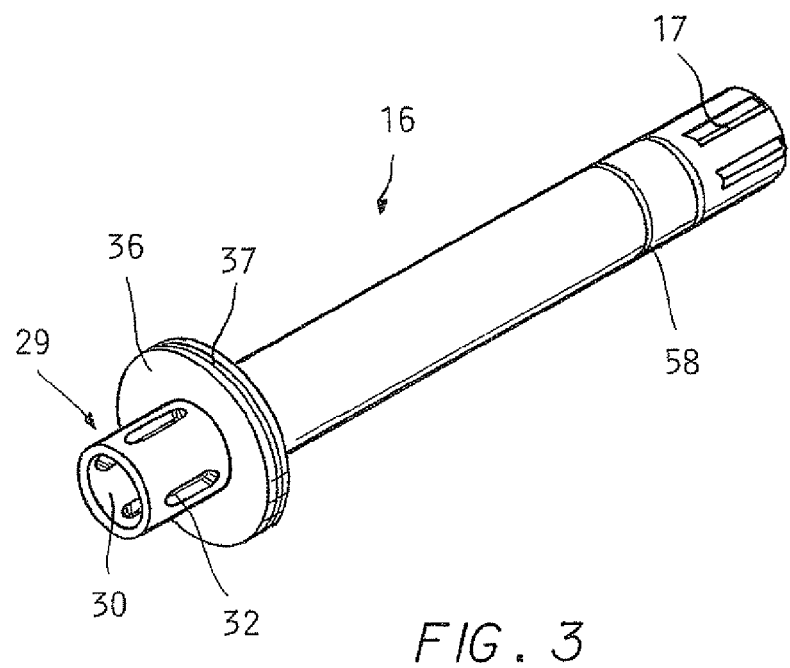
FIG. 3 is an isometric view of a rotor shown in FIG. 1.

As illustrated in FIG. 3, the rotors 16 are preferably rod shaped, and each rotor 16 includes a sleeve 29 having a bore 30. The bore 30 as illustrated extends only a set distance axially into the rotor 16. However, sealed through-bores extending axially through the rotors 16 can also be used so long as the through-bore is sufficiently sealed to prevent hydraulic fluid leakage. The diameter of the bores 30 is slightly larger than the outer diameter of the shafts 26 of the impeller 14. The sleeve 29 of each rotor 16 includes at least one slot 32, and the number of slots 32 (four shown) can correspond with the number of grooves 28 on the shafts 26 of the impeller 14. If multiple slots 32 are placed on a single rotor 16, the slots 32 are spaced at the same intervals as the grooves 28 on the shafts 26 of the impeller 14. The ends of the rotors 16 opposite the slotted ends are adapted to connect to stabilizer bar arms 34. For example, the rotors 16 can include splines 17 that engage splines on the stabilizer bar arms 34. The rotors 16 can include sealing discs 36 at an axial distance from the slotted ends of the rotors 16 such that when the rotors 16 are installed in the housing 12 each sealing disc 36 is between an end of the housing 12 and a fluid port 18, and not between the two fluid ports 18. The sealing disc 36 as illustrated in FIG. 3 is preferably formed integrally with the rotor 16 and includes a seal 37 circumscribing its circumference. However, sealing discs 36 can also be separate pieces with apertures slightly large than the outside diameter of the rotors 16. If the sealing discs 36 are separate pieces, the sealing discs 36 include seals 37 along both their interior aperture circumferences and outside circumferences, and the discs 36 can be held in placed by snap rings or other known fastening methods. Multiple sealing discs 37 can be included along a single rotor 16 if desired or necessary for sealing. Each rotor 16 can also include circumferential grooves 58 to accept snap rings 56 in order to secure additional bearings 50 or seals 52 as illustrated in FIG. 4.

FIG. 4 illustrates the exemplary adjustable vehicle stabilizer bar system components 10 shown in FIG. 1 without the housing 12 for illustrative purposes. When assembled, the impeller 14 is disposed in the central portion of the housing 12. The rotors 16 are at least partially inserted into the housing 12 such that the shafts 26 of the impeller 14 partially penetrate the bores 30 of the rotors 16. The rotors 16 and shafts 26 are aligned such that at least one groove 28 in each shaft 26 is aligned with at least one slot 32 in each rotor 16. In one example, ball bearings 38 are disposed in the slots 32 of the rotors 16 and engage the helical grooves 28 on the shafts 26. A ball retainer 39 (shown in FIG. 4) can be placed over the slots 32 on the rotors 16 to hold the balls 38 in place. Other bearing systems for rotatably coupling shafts 26 to rotors 16 known by those skilled in the art may be used.

As is best illustrated in FIG. 1, the seal 24 on the piston 20 of the impeller 14 and the sealing discs 36 on the rotors 16 create two cavities 40, one on each side of the piston 20, inside the housing 12. An additional bearing 50 and seal 52 can be provided on each rotor 16 near the openings at the ends of the housing 12. The bearing 50 can be seated against a step in diameter in the housing 12 (not shown), and snap rings (not shown) can be clipped into the circumferential grooves 58 on the rotors 16 to secure the bearing 50 along the rotor 16. Each cavity 40 is fluidly accessible via one of the fluid ports 18.

Referring to FIG. 7, an alternate example of the stabilizer bar system 10 is shown. In this example, only one rotor 16 is used with the impeller 14 as previously described. In this example, the rotor 16 (shown to the left) is eliminated and a bearing 74 which is fixed to the inside of housing 12 is used as generally shown. The stabilizer bar arm 34a is also fixed to the housing 12. In this configuration, the second shaft 70 connected to the impeller does not have the helical grooves 28 or ball bearings 38 as previously described in the example in FIG. 1. Second shaft 70 may be a smooth rod or solid bar that is axially slideable in a seal 76 allowing axial translation of the second shaft 70 with respect to bearing 74 and affixed housing 12. In this example, axial movement of impeller 14 rotates first shaft 26, rotor 16 and stabilizer bar arm 34 in a manner previously described relative to housing 12 and affixed stabilizer bar arm 34a. It is understood that other methods for sealingly connecting rod 70 to bearing 74 and thus to housing 12 may be used as known by those skilled in the art. It is also understood that the second shaft 70 and first shaft 26 and their respective connected components can be positioned on the opposite side of impeller 14 other than as illustrated.

The connection of the stabilizer bar 10 to a vehicle can depend on the type of suspension the vehicle has. If a vehicle has independent suspension, as illustrated in FIG. 5, the stabilizer bar 10 can be attached to the frame 60 of the vehicle, the end of each rotor 16 that is adapted for connection to a stabilizer bar arm 34 can be connected to a stabilizer bar arm 34, and the opposite end of the stabilizer bar arm 34 from the rotor 16 can be connected to other suspension components 42, for example, a vehicle control arm. If the vehicle has a solid axle, the housing 12 can be attached to the structure 60 of the vehicle and the stabilizer bar arms 34 can be attached to the axle or other suspension components. However, the stabilizer bar housing 12 can alternatively be attached to the axle, in which case the stabilizer bar arms 34 can be connected to the vehicle structure 60 of the vehicle.

FIG. 6 is a flowchart showing an exemplary operation of the adjustable vehicle stabilizer bar system 10. Sensors 46 can detect at least one of the lateral acceleration of the vehicle, the roll angle of the vehicle, the angle of the steering wheel, the steering wheel torque, the yaw angle and/or velocity of the vehicle, the velocity of the vehicle, and any other conditions recognized as relevant by one of skill in the art having knowledge of this application. The sensors 46 may also receive input from other vehicle systems, for example, the vehicle anti-lock braking system. The sensors 46 then transmit signals corresponding to the detected values to a controller 48. The controller 48 controls a pump 44, and one or more fluid control valves (not shown) positioned between the pump 44 and stabilizer bar system 10. The pump 44 through the control valves pumps fluid (preferably hydraulic fluid, but alternately through pneumatics) through one fluid port 18 and into one of the cavities 40. The pump 44 can be the same pump used to power a power steering mechanism but may be a separate hydraulic or other fluid pump. The control valve may be a conventional servo operated spool valve, an electrically operated three-way valve, combination of two-way valves or other valve systems known by those skilled in the art.

The controller 48 may include a microprocessor and software to store preprogrammed performance profiles of other instructions based on input from the sensors or other sources of data input. As fluid passes through at least one of the fluid ports 18, one cavity 40 becomes a high pressure cavity and the other becomes a low pressure cavity. As the pressure difference between the high pressure cavity and the low pressure cavity increases, the impeller 14 is pushed axially. Using the example shown in FIG. 1, because the grooves 28 on the shafts 26 of the impeller 14 are helical, axial movement of the impeller 14 results in rotational movement of the rotors 16. Moreover, because the grooves 28 in the shafts 26 of the impeller 14 spiral in opposite directions, the rotors 16 rotate in opposite directions in response to the axial movement of the impeller 14. Each rotor 16 rotates the stabilizer bar arm 34 that the rotor 16 is connected to, and the stabilizer bar arm 34 applies force to other suspension components, for example, a vehicle control arm 42 to move the vehicle control arm 42 into a desired position relative to the chassis of the vehicle. Thereby, the adjustable vehicle stabilizer bar 10 transfers fluid pressure into force applied to vehicle control arms 42 to controllably alter and enhance the stability of the vehicle. Thus, the adjustable vehicle stabilizer bar 10 can actively respond to the current state of the vehicle to selectively alter and enhance the stability of the vehicle compared to known stabilizer bars.

In operation, the stabilizer bar system 10 is operated based on the current state of the vehicle. The controller 48 can control the pump 44 to ensure the ratio of yaw rate to lateral acceleration conforms to a predetermined value, which can be a function of the yaw rate. For example, if both wheels of the vehicle hit a bump and remain in phase, the impeller 14 and both rotors 16 rotate together relative to the housing, and the bar system 10 is not actuated. However, if a driver makes an evasive maneuver, for example, the controller 48 determines the correct amount of force required to counteract the body roll of the vehicle based on the state of the vehicle and actuates the pump 44 to produce a proportional counteracting force in the stabilizer bar system 10. Moreover, the stabilizer bar system 10 can be actuated by the controller 48 based on, for example, the speed of the vehicle and the yaw rate of the vehicle prior to the vehicle experiencing body roll. Thus, the bar system 10 is actuated to produce the desired or necessary amount of force and can avoid a lagging or overshooting response, resulting in a predictable vehicle response even if wheel slip or a single wheel event is encountered. Similarly, if the vehicle experiences side-wind or one wheel hits a bump, the bar system 10 can provide counteracting force that does not require the driver to steer the vehicle to keep it moving in a straight line. If the vehicle begins to understeer in a turn due to a low friction driving surface, the stabilizer bar system 10 can apply force to one wheel to reduce understeering, thereby enhancing the stability of the vehicle even if the vehicle is not experiencing high lateral acceleration.

In alternative embodiments, the structure by which the axial movement of the impeller 14 is converted into rotational movement of the rotors 16 can differ from the examples described above. For example, the shafts 26 of the impeller 14 can be bored and include slots to hold ball bearings, and the rotors 16 can include helical grooves. Or, the shafts 26 can include helical grooves and the rotor(s) 16 can include corresponding slots to engage the grooves.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An active vehicle stabilizer bar system comprising:
   a tubular housing having a longitudinal axis;
   an impeller positioned in the housing along the axis having a piston radially extending about the axis in sealing engagement with the housing, the impeller further having a first shaft and an opposing second shaft extending axially from the piston, the impeller linearly translatable along the housing axis; and
   at least one rotor rotatably coupled to one of the first and the second impeller shafts, the at least one rotor having a bearing engaged with the coupled impeller shaft such that linear movement of the piston along the axis rotates the at least one rotor about the axis with respect to the housing.

2. The stabilizer bar system of claim 1 further comprising a first fluid port and a second fluid port, the impeller piston positioned axially between the first and second ports defining a first and second sealed cavity in the housing in respective fluid communication with the first and second ports.

3. The stabilizer bar of claim 2 wherein the at least one of the first and the second shafts include at least one groove on an outer surface of the shaft engaged with the rotor bearing.

4. The stabilizer bar of claim 3 wherein the at least one rotor comprises a first and a second rotor axially spaced from the first rotor separated by the impeller, each rotor respectively coupled to the first and second impeller shafts through the at least one groove on the respective impeller shafts.

5. The stabilizer bar of claim 4 wherein the at least one shaft groove is positioned at a helical angle about the axis, the at least one groove in the first shaft angularly oriented in a direction opposite than the at least one groove in the second shaft.

6. The stabilizer bar of claim 4 wherein the first and the second rotors are positioned substantially within the housing along the longitudinal axis.

7. The stabilizer bar of claim 4 wherein the first and second rotor each define a sleeve having an axial bore for receipt of the respective first and second impeller shafts.

8. The stabilizer bar of claim 7 wherein the sleeve further defines at least one slot in alignment with a helical groove in the respective first and the second impeller shaft, the bearing in engagement with the helical groove and the slot.

9. The stabilizer bar of claim 6 wherein the housing comprises a one piece unit.

10. The stabilizer bar of claim 3 wherein the second impeller shaft is received in a bearing fixed to the housing allowing axial translation of the impeller relative to the housing.

11. An adjustable vehicle stabilizer bar system for use in applying variable forces on a vehicle suspension, the stabilizer bar comprising:
- a tubular housing having a longitudinal axis including a first fluid port and a second fluid port;
- an impeller having a piston positioned in the housing separating the housing into a first sealed cavity in fluid communication with the first fluid port and a second sealed cavity in fluid communication with the second fluid port, the impeller having a first shaft and an opposing second shaft axially extending from the piston, at least one of the first and the second shafts including a helical groove angularly oriented about the axis, the impeller linearly translatable along the housing axis; and
- at least one rotor positioned substantially within the housing and axially separated by the impeller, the at least one rotor rotatably connected to one of the impeller first and the second shafts by a bearing engaged in the helical groove in the respective first or second shaft, wherein linear movement of the impeller along the housing axis rotates the at least one rotor with respect to the housing.

12. The stabilizer bar of claim 11 wherein the at least one rotor further comprises a sleeve defining a through slot in communication with an axial bore for receipt of the respective first or second impeller shaft.

13. The stabilizer bar of claim 12 wherein the sleeve slot is aligned with the helical groove in the respective first and second impeller shaft, the bearing in engagement with the helical groove and the slot permitting rotation of the at least one rotor with respect to the housing.

14. The stabilizer bar of claim 11 wherein the angle of the helical groove about the axis is between about 4 and 15 degrees.

15. The stabilizer bar of claim 11 wherein the at least one rotor comprises a first rotor and a second rotor axially separated by the impeller and rotatably coupled to the respective first and the second impeller shafts, the helical groove in the respective first and second impeller shafts oriented in opposite directions about the axis.

16. The stabilizer bar of claim 15 wherein the housing comprises a single piece and is stationary with respect to the rotatable rotors.

17. The stabilizer bar of claim 11 further comprising a controller for selective control of a flow of a pressurized fluid from a hydraulic pump through at least one of the first and second ports to linearly move the piston along the axis.

18. The stabilizer bar of claim 17, further comprising:
- at least one sensor in electronic communication with the controller for determining at least one of a vehicle lateral acceleration, a vehicle roll angle, a steering wheel angle, a steering wheel torque, a yaw angle of the vehicle, a vehicle speed, and an anti-lock braking system condition.

19. An adjustable vehicle stabilizer bar for use in applying variable forces on a vehicle suspension, the stabilizer bar comprising:
- an elongate single piece hollow housing having a longitudinal axis;
- a first and a second fluid port in the housing;
- an impeller positioned in the housing along the axis having a piston positioned between the first and the second fluid port sealingly engaged with the housing defining first and second sealed cavities in the housing, a first and a second shaft axially extending from opposite sides of the piston, each shaft having a helical groove angularly oriented about the axis in opposite directions;
- a first rotor and a second rotor substantially positioned inside the housing each having a sleeve defining an axial bore for receipt of the respective first and the second impeller shafts, each sleeve further defining a through slot in communication with the axial bore and in alignment with the respective helical groove, the first and the second rotor each connected to a stabilizer bar arm connected to the vehicle suspension; and
- a bearing positioned in the rotor sleeve slot and the helical groove wherein on selected application of a pressurized fluid through at least one of the first and the second ports the piston is linearly translated along the axis thereby rotating the stabilizer bar arms in opposite directions with respect to the housing to vary the forces applied by the stabilizer bar on the vehicle suspension.

* * * * *